(No Model.)
J. G. EBKEN.
Fifth Wheel for Vehicles.
No. 241,336. Patented May 10, 1881.
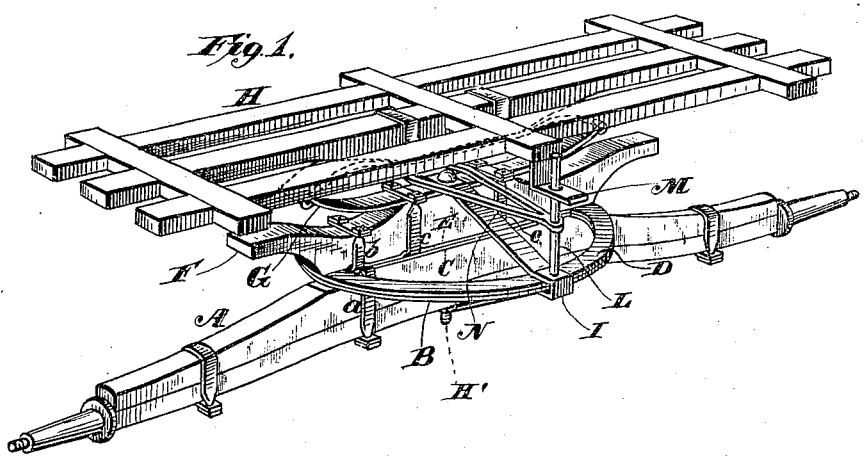
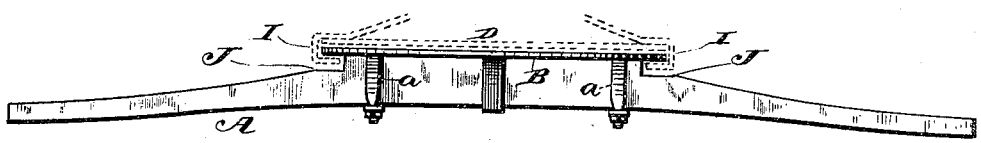
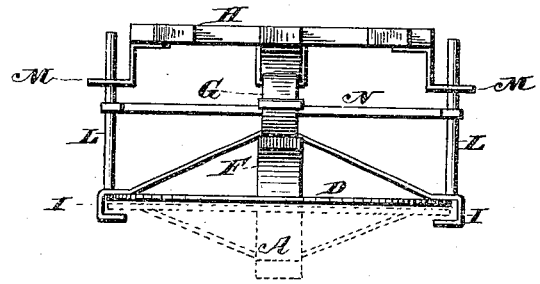
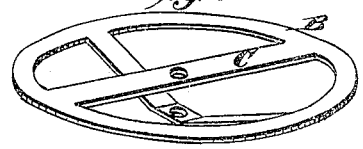
Witnesses.
Robert Everett.
J. A. Rutherford.
Inventor.
John G. Ebken.
by James L. Norris.
Atty.

UNITED STATES PATENT OFFICE.

JOHN G. EBKEN, OF PITTSBURG, PENNSYLVANIA.

FIFTH-WHEEL FOR VEHICLES.

SPECIFICATION forming part of Letters Patent No. 241,336, dated May 10, 1881.

Application filed March 11, 1881. (No model.)

*To all whom it may concern:*

Be it known that I, JOHN GEORGE EBKEN, a citizen of the United States, residing at Pittsburg, in the county of Allegheny and State of Pennsylvania, have invented new and useful Improvements in Fifth-Wheels for Vehicles, of which the following is a specification.

The present invention relates to fifth-wheels for vehicles, and is mainly designed to permit the front wheels to move in the path of a complete circle, and to obviate the wrenching or straining of the running-gear when one wheel of the vehicle runs on a higher plane than the other.
The invention consists in a lower circle-plate having a cross-bar or plate which rests upon the top of the front axle and is secured thereto by clips or other suitable means. The upper circle-plate is also provided with a cross bar or plate which is secured to the under side of the head-block or perch and carries vertical rods passing through stirrups secured to the wagon bed or platform. Hooked flanges projecting from the upper circle-plate embrace or fit under the lower circle-plate, and serve to hold both plates in contact with each other. Offsets or shoulders formed on the axle permit these hooked flanges to pass beyond or clear the same when the axle is turned. The rods or stems rising from the upper fifth-wheel plate are connected with each other by a longitudinal brace which passes through the body-supporting spring carried by the head-block.

In the drawings, Figure 1 is a perspective view, showing the fifth-wheel, front axle, head-block, and wagon-bed. Fig. 2 is a detached view of the front axle carrying the lower circle-plate and provided with offsets or shoulders for the passage of the hooked flanges of the upper circle-plate. Fig. 3 is a detached view of the head-block, upper circle-plate, and guide-stems carried thereby. Fig. 4 is a perspective view of the lower circle-plate.

The letter A designates the front or movable axle of a vehicle. It carries the centrally-located circle-plate or lower section, B, of the fifth-wheel, which is constructed with or has welded or otherwise secured thereto the transverse bar or plate C. This bar rests directly upon the upper face of the axle, and is secured thereto by clips *a* passing around it and said axle. The upper circle-plate or top section, D, of the fifth-wheel moves upon the lower plate in the customary manner, and is also constructed or provided with a transverse bar or plate, E, which fits on the under side of the head-block or perch F, and is secured thereto by means of clips *b*, or other suitable fastening devices. The head-block carries an elliptical spring, G, of any preferred form or dimensions, upon which rests the wagon bed or platform H. The spring is secured to the head-block by clips *c*, which also serve to retain the upper circle-plate in position. The customary king-bolt H' passes through the head-block, transverse bars of the fifth-wheel, and axle, and serves to hold these parts in proper relation to each other. The two circle or turn plates comprising the fifth-wheel are also held in frictional or proper contact with each other by means of hooked flanges I, which are carried by the upper circle-plate and embrace the lower plate secured to the axle. Offsets or shoulders J formed on the axle in line with the transverse bar of the lower circle-plate, or immediately below said plate, serve to permit the passage of the hooked flanges I. In this manner the flanges are permitted to clear the axle when the latter is turned, and thus the wheels are enabled to move in the path of a complete circle. The hooked flanges I may form part of a longitudinal brace-bar, K, which extends from the front to the rear of the upper circle-plate, and is secured to the same and to the head-block or to the lower leaf of the body-supporting spring. These flanges, however, may also form an integral part of the upper fifth-wheel plate or be permanently secured thereto by welding or otherwise.

In order to permit the wagon-body to move up and down in a true vertical plane and prevent the wrenching or straining of the body-supporting spring when one wheel runs on a higher plane than the other, I provide the vertical guide or steadying rods L, which rise from the upper circle-plate and extend through eyes of stirrups or hangers M, bolted or otherwise secured to the under side of the wagon bed or body. These guide-rods are secured to the upper circle-plate by screw-shanks and nuts, or they may be permanently secured to said plate by welding or otherwise. A longitudinal brace-bar, N, extending from or secured to both guide-rods and passing through the space between the upper and lower sections of springs, serves to give the necessary degree of rigidity or strength to the guide-rods so as to maintain the same in an erect position or obviate the bending thereof.

The stirrups M, secured to the wagon-body, are free to move up and down on the guide-rods, and thus it follows that the wagon-body must also move in a true vertical plane.

I have not deemed it necessary to show the manner of attaching the reach and draft-pole, because this can be effected in any preferred manner.

What I claim is—

1. In a fifth-wheel for vehicles, the combination of the lower circle or turn plate having a transverse bar, the upper circle or turn plate having a transverse bar and hooked flanges, and the front axle provided with offsets or shoulders, with the head-block, king-bolt, and wagon-body, as and for the purpose set forth.

2. The combination of the upper fifth-wheel plate, provided with vertical guide-rods or stems, and the wagon-body having stirrups for receiving said rods, with the front axle, lower fifth-wheel plate, head-block, and body-supporting spring, as and for the purpose set forth.

In testimony whereof I have hereunto set my hand in the presence of two subscribing witnesses.

JOHN GEORGE EBKEN.

Witnesses:
H. E. MARCHAND,
Z. C. MARLATT.